United States Patent [19]

Tsou

[11] 3,860,546
[45] Jan. 14, 1975

[54] ELECTROCOATING BATH OF CARBOXYLIC RESIN FROM TRIMELLITIC ANHYDRIDE AND POLYURETHANE POLYOL

[75] Inventor: Ivan H. Tsou, Bloomfield Hills, Mich.

[73] Assignee: Ford Motor Company, Dearborn, Mich.

[22] Filed: Mar. 4, 1974

[21] Appl. No.: 448,162

Related U.S. Application Data

[60] Continuation-in-part of Ser. No. 316,321, Dec. 29, 1972, , which is a division of Ser. No. 75,748, Sept. 25, 1970, Pat. No. 3,709,846, which is a continuation-in-part of Ser. No. 733,814, April 25, 1968, abandoned, which is a continuation-in-part of Ser. Nos. 363,814, April 30, 1964, abandoned, and Ser. No. 734,825, April 24, 1968, abandoned, which is a continuation-in-part of Ser. No. 363,815, April 30, 1964, abandoned.

[52] U.S. Cl... 260/29.2 TN, 204/181, 260/77.5 AN, 260/77.5 AM
[51] Int. Cl..... B01k 5/02, C08g 51/24, C08g 22/16
[58] Field of Search............. 260/77.5 AN, 29.2 TN; 204/181

[56] References Cited

UNITED STATES PATENTS

| 3,477,977 | 11/1969 | Schnell et al. | 260/29.2 TN |
|---|---|---|---|
| 3,607,800 | 9/1971 | Sekmakas | 260/29.2 TN |
| 3,624,013 | 11/1971 | Sekmakas | 260/29.2 EP |
| 3,709,846 | 1/1973 | Tsou | 260/29.2 TN |

Primary Examiner—Murray Tillman
Assistant Examiner—Arthur H. Koeckert
Attorney, Agent, or Firm—Olin B. Johnson; Keith L. Zerschling

[57] ABSTRACT

A novel coating bath for anodic deposition of paint comprises, on a pigment and particulate filler-free basis, an aqueous dispersion of a water-soluble base, and a unique polycarboxylic acid formed by (a) reacting 2 molar parts of a diisocyanate with 1 molar part of a diol, (b) reacting the product of (a) with 2 molar parts of a diol or triol, and (c) reacting the product of (b) with about 0.5 to about 2 molar parts of trimellitic anhydride.

1 Claim, No Drawings

ELECTROCOATING BATH OF CARBOXYLIC RESIN FROM TRIMELLITIC ANHYDRIDE AND POLYURETHANE POLYOL

This application is a continuation-in-part of copending application Ser. No. 316,321 filed Dec. 29, 1972, which in turn is a divisional application of application Ser. No. 75,748 filed Sept. 25, 1970 with which it was copending. Application Ser. No. 75,748 was in turn a continuation-in-part of application Ser. No. 733,187 filed Apr. 25, 1968 with which it was copending. Application Ser. No. 733,187 was in turn a continuation-in-part of applications Ser. No. 363,814 filed Apr. 30, 1964 and Ser. No. 734,825 filed Apr. 24, 1968 with which it was copending. Application Ser. No. 734,825 was in turn a continuation-in-part of application Ser. No. 363,815 filed Apr. 30, 1964 with which it was copending. All of the aforementioned patent applications excepting application Ser. No. 316,321 and application Ser. No. 75,748 are now abandoned. Application Ser. No. 75,748 issued as U.S. Pat. No. 3,709,846 on Jan. 9, 1973.

BACKGROUND OF THE INVENTION

Electrically induced deposition of a paint comprising pigment and a polycarboxylic acid resin provides an effective means for placing a coating of uniform depth upon all exposed areas of metal articles, including those having recessed or irregularly shaped surfaces. This process is exemplified in the art by Gilchrist, U.S. Pat. No. 3,230,162.

Large scale coating operations require that the coating materials employed in such process provide a physically and chemically stable coating bath, i.e., a bath that will permit continuous or intermittent addition of replacement feed, provide a uniform, blemish-free film, and when applied to articles subjected to outdoor exposure, a high level of corrosion protection after conventional treatment to effect heat curing.

Preferably, the coating material for use in this process is one that requires a minimum of electrical energy to provide a film of acceptable thickness in a minimum of time upon the most inaccessible and/or electrically shielded surfaces of the workpiece. The degree to which a given coating material possesses this characteristic in relation to other coating formulations under like conditions is termed the "throw" or "throwing power" of the formulation.

THE INVENTION

This invention is concerned with novel and superior coating materials for use in the aforedescribed painting process and to a coating bath containing the same. This bath will ordinarily include a particulate pigment, a water-soluble base, preferably a water-soluble amine, although other bases such as ammonium hydroxide, potassium hydroxide, lithium hydroxide, etc., may be used, and a polycarboxylic acid binder resin.

At least the predominant fraction of the film-forming paint binder resin of this coating bath is a polycarboxylic acid resin having an acid number above about 20, preferably in the range of about 35 to about 75, although resins with higher acid numbers can be used, e.g., 75 to 150. The carboxylic acid resin of this bath composition derives its acidity, i.e., free carboxyl groups, from trimellitic anhydride. The urethane linkages of the carboxylic acid resin of this invention are derived from the reaction of a diisocyanate and polyhydric alcohols. More specifically, the polycarboxylic acid resins of the unique coating bath compositions of this invention are formed by (a) reacting two molar parts of a diisocyanate with one molar part of a dihydric alcohol, (b) reacting the product of (a) with two molar parts of a dihydric or trihydric alcohol, and (c) reacting the product of (b) with about 0.5 to about 2 molar parts of trimellitic anhydride.

Electrically induced deposition from an aqueous coating bath using the aforedescribed polycarboxylic acid resin is facilitated by exceptionally high throwing power. The two closely associated free carboxyl groups per acid molecule in these resins appears to account for their evidencing high chemical stability in both the coating bath and the deposited film. This permits their effective use in coating baths of greater basicity and reduces the requirements of pH control. The use of diisocyanates as reactants in the formation of the polycarboxylic acid resins provides the coatings thus obtained with abrasion resistance.

The triols which are suitable for use with this invention include $C_3$-$C_7$ triols consisting essentially of carbon, hydrogen and oxygen, e.g., glycerine, trimethylolbutane, trimethylolethane and trimethylolpropane.

The diols which are suitable for use with this invention include $C_4$-$C_8$ diols consisting essentially of carbon, hydrogen and oxygen, e.g., diethylene glycol, 1,3 - butylene glycol, 1,6 - hexane diol, neopentyl glycol, 1,4 - dimethylol cyclohexane and 1,4 - cyclohexanemethanol.

The diisocyanates suitable for use with this invention include toluene diisocyanate, 4,4' - diphenylmethane diisocyanate, 4,4' - dicyclohexane diisocyanate, isophorone diisocyanate, Desmudur-N, a trade name of Mobay Chemical Co., a division of Baychem Corp., Pittsburg, Pa. for a high molecular weight biuret containing polyisocyanate obtained by reacting 3 moles hexamethylene diisocyanate with 1 mole of water.

The reaction of the diol with diisocyanate and the reaction of diol or triol with the product of the first step reaction are carried out under the same range of conditions. These reactions are the urethane-forming reactions and are conventional additional reactions. These reactions are carried out at a temperature in the range of about 20° to 75°C. The diisocyanate is introduced slowly and a slight exotherm results. The temperature can be controlled by the rate of addition of the diisocyanate supplemented by external cooling. A preferred temperature for these reactions is about 30° to about 50°C. A catalyst such as dibutyl tin dilaurate in the amount of about 0.1 to about 0.2 weight percent (basis weight of reactants) may be mixed with a non-reactive solvent, e.g., xylene, and introduced into the reaction mixture. The reaction temperature is maintained until essentially all of the hydroxyl groups have reacted in the first step reaction and until essentially all of the isocyanate groups have reacted in the second step reaction. In either case, this can be determined after testing for unreacted isocyanate groups with a conventional analytical tests.

The test I prefer for determining the amount of unreacted isocyanate is made in the following manner: (1) prepare a test reagent by placing 259 grams of a 2 normal solution of dibutyl amine to a 1,000 ml flask and dilute with distilled toluene to 1,000 ml, (2) prepare an indicator by dissolving 0.1 grams of Bromophenol Blue in 1.5 ml of 0.1 normal NaOH and add 100 ml distilled water, (3) weigh out and place about 6 grams of the sample to be tested in a 500 ml flask, dilute with 25 ml of distilled toluene and set aside, (4) prepare a control by placing 25 ml of distilled toluene in a second 500 ml flask, (5) add to each flask 20 ml of the dibutyl amine and gently stir using a magnetic stirrer until the exotherm subsides and allow to cool, (6) add 100 cc of anhydrous isopropanol to each flask, (7) add 0.5 ml of the Bromophenol Blue indicator to each flask, (8) titrate by adding to each flask a standard 1 normal HCl solution to a yellow end point and calculate as follows - ml of HCl solution used for the control minus ml of HCl solution used for the test sample × 4.20 (constant) exact amount of grams of sample (e.g., 5.9 − 6.1) = free isocyanate percent by weight of sample. These reactions are ordinarily complete in three hours or less.

The reaction of trimellitic anhydride with hydroxyl groups of a polyol is a conventional esterification reaction. This reaction is herein carried out within a narrow temperature range, i.e., about 165°C (330°F) to about 168°C (335°F).

All reactions involved in preparing these polycarboxylic acid resins are preferably carried out at atmospheric pressure in an inert gas atmosphere.

These resins may be admixed with conventional pigments, fillers, extenders, polymerizable monomers, etc. The resultant coating formulations are dispersed in the aqueous bath in amounts such as to provide about 2 to 20, preferably about 5 to about 12 percent solids. They are effectively dispersed with conventional dispersal assistants for polycarboxylic acid resins, e.g., ammonia, ethanolamine, diethylamine, diethanolamine, triethanolamine, isopropanolamine, diisopropanolamine, hydroxylamine, morpholine, N-methyl ethanolamine, etc. Non-volatile basis, e.g., potassium hydroxide, lithium hydroxide, etc., obviously can be used but the organic bases are preferred.

This invention will be more fully understood from the following illustrative examples:

EXAMPLE 1

A polyurethane paint binder resin is prepared from the following materials using the procedure hereinafter set forth:

| Materials | Mols | Parts by Weight |
|---|---|---|
| Toluene diisocyanate | 2 | 350 |
| Diprophlene glycol | 1 | 135 |
| Glycerine | 2 | 200 |

Procedure

The diisocyanate is charged to a stainless steel vessel equipped with reflux condenser, agitator, means for heating and cooling, a nitrogen inlet and charged with an inert atmosphere (dry nitrogen).

The diisocyanate is heated to about 40° − 75°C. (100°–165°F), preferably 40°C, or slightly above, and the dipropylene glycol is added to the stirred diisocyanate at a rate such that the temperature of the reaction mixture stays below 75°C (165°F). During this reaction, the temperature of the reaction mixture is maintained below 75°C by external cooling and the rate of addition.

When the addition of the glycol is complete, the temperature is maintained at 75°C for an additional 3 hours to assure completion of the reaction.

After the three hour period, the glycerine is added to the reaction mix using the same procedure and conditions used in the addition of glycol. After addition of the glycerine is complete, the temperature is again maintained at 75°C for three hours to assure completion of the reaction.

One mole of trimellitic anhydride is added to the reaction mixture and the reaction mixture is heated to 165°C (330°F). This temperature is maintained until an acid number of about 65 is reached. This resin is cooled by slowly charging isopropyl alcohol through the reflux condenser. An organic solvent is conventionally employed with the acid resin in the coating bath and the addition of this solvent, in this instance isopropyl alcohol, at this time facilitates further handling. The concentration of this solvent should not exceed 30 weight percent of the resin. This resin solution and diisopropanol amine are dispersed in water in amounts to provide a coating bath containing about 6 percent resin solids and having a pH of about 8.6. This resin is anodically deposited with the bath container serving as the cathode of the electrodeposition cell. Steel panels immersed in the bath are electrically charged and serve as anodes of the cell. Coating is carried out at 65°F at an impressed direct current potential of 350 volts. A uniform deposit is obtained on the panels. The panels are removed from the bath, rinsed with water, blown dry and baked for 15 minutes at 380°F.

EXAMPLE 2

The procedure of Example 1 is repeated except for the differences that two moles of trimellitic anhydride are employed and the resin is cooked to an acid number of about 92.

EXAMPLE 3

The procedure of Example 1 is repeated except for the differences that ½ mole of trimellitic anhydride is employed and the resin is cooked to a corresponding acid number.

EXAMPLE 4

The procedure of Example 1 is repeated except for the differences that the glycol is neopentyl glycol, the diisocyanate is 4,4' - diphenylmethane diisocyanate, and the triol is 1,2,6 - hexane triol.

EXAMPLE 5

The procedure of Example 1 is repeated except for the differences that the dipropylene glycol is replaced with an equimolar amount of hexamethylene glycol, the toluene diisocyanate is replaced with an equimolar amount of 1 - ethyl - 2,4 - phenylene diisocyanate, and the glycerine is replaced with an equimolar amount of diethylene glycol.

EXAMPLE 6

The procedure of Example 1 is repeated with the differences that the dipropylene glycol is replaced with an equimolar amount of 1,5 - pentanediol, the toluene diisocyanate is replaced with an equimolar amount of 1 - phenoxy - 2,4 - phenylene diisocyanate,, and the glycerine is replaced with an equimolar amount of tetraethylene glycol.

EXAMPLE 7

The procedure of Example 1 is repeated except for the differences that an equimolar amount of 1,4 - dimethylol cyclohexane is substituted for the dipropylene glycol, an equimolar amount of trimethylolbutane is substituted for the glycerine and an equimolar amount of isophorone diisocyanate is substituted for the toluene diisocyanate.

EXAMPLE 8

The procedure of Example 1 is repeated except for the difference that an equimolar amount of 4,4' - dicyclohexane diisocyanate is substituted for the toluene diisocyanate.

The term "polycarboxylic acid resin" as employed herein means an organic resin having dissociable carboxyl groups in its molecular structure. Such a resin is formed by reacting a plurality of molecules of at least two different organic compounds of which at least one such compound is a carboxylic acid and wherein the reaction is such that one or more carboxyl groups from each molecule of such carboxylic acid remain as free or dissociable carboxyl groups when the resin is formed.

It will be understood by those skilled in the art that modifications can be made within the foregoing examples without departing from the scope of this invention as hereinbefore described and hereinafter claimed.

We claim:

1. In a bath composition for electrodepositing paint upon an anode and comprising on a pigment and particulate filler-free basis an aqueous dispersion of a film-forming, polycarboxylic acid, paint binder resin at least partially neutralized with a water-soluble base, the improvement wherein said polycarboxylic acid, paint binder resin is formed by:

A. reacting 2 molar parts of an organic diisocyanate with 1 molar part of a $C_4$ - $C_8$ diol consisting essentially of carbon, hydrogen and oxygen at a temperature in the range of about 20°C to 75°C, B. reacting the product of (A) with 2 molar parts of a polyhydric alcohol selected from the group consisting of $C_4$ - $C_8$ diols consisting essentially of carbon, hydrogen and oxygen and $C_3$ - $C_7$ triols consisting essentially of carbon, hydrogen and oxygen at a temperature in the range of about 20°C to about 75°C, and C. reacting the product of (B) with about 0.5 to about 2 molar parts of trimellitic anhydride at a temperature in the range of about 165° to about 168°C.

* * * * *